United States Patent [19]

Lal et al.

[11] Patent Number: 5,432,012
[45] Date of Patent: Jul. 11, 1995

[54] THIN-FILM MEDIUM WITH COMPOSITIONAL GRADIENT

[75] Inventors: Brij B. Lal, San Jose; Tadashi Shinohara, Fremont, both of Calif.

[73] Assignee: HMT Technology Corporation, Fremont, Calif.

[21] Appl. No.: 907,774

[22] Filed: Jun. 30, 1992

[51] Int. Cl.$^6$ ............................ G11B 5/66; B32B 5/14
[52] U.S. Cl. ........................ 428/610; 428/332; 428/336; 428/611; 428/678; 428/694 T; 428/694 TS; 428/694 TM; 428/900
[58] Field of Search ............... 428/694, 678, 610, 611, 428/900, 928, 694 T, 694 TS, 694 TM, 332, 336; 204/192.2, 192.15, 192.23, 298.23, 298.25, 298.26; 427/127, 128, 129, 130, 131, 132

[56] References Cited

U.S. PATENT DOCUMENTS

| | | | |
|---|---|---|---|
| 4,293,621 | 10/1981 | Tagami | 428/678 |
| 4,603,091 | 6/1986 | Mukasa et al. | 428/611 |
| 4,610,911 | 9/1986 | Opfer et al. | 428/213 |
| 4,632,883 | 12/1986 | Howard et al. | 428/611 |
| 4,677,032 | 6/1987 | Robinson | 428/611 |
| 5,356,522 | 10/1994 | Lal | 204/192.15 |

FOREIGN PATENT DOCUMENTS 62-267942 11/1987 Japan .

OTHER PUBLICATIONS

Ranjan et al, J. Appl. Phys. 69 (8) Apr. 15, 1991 Magnetic Recording and Crystalline Properties of Multilayered Longitudinal Thin Film Media.

Howard, J. K., "Thin films for magnetic recording technology: A review," J. Vac. Sci. Technol.A 4(1):1–13 (1986).

Kitada, M., and Shimizu, N., "Magnetic properties of sputtered Co-Pt thin films," J. Appl. Phys. 54(12):7089–7094 (1983).

Miller, M. S., et al., "Optimization of low-noise media for 100-Mb/in.$^2$ recording with a magnetoresistive head," J. Appl. Phys. 69(8):4715–4717 (1991).

Miura, S., et al., "Noise and Bit Jitter Performance of CoNiPt Thin Film Longitudinal Recording Media and Its Effect on Recording Performance," IEEE Trans. Magnetics 24(6):2718–2720 (1988).

Ranjan, R., et al., "Magnetic, recording, and crystalline properties of multilayered longitudinal thin-film media," J. Appl. Phys. 69(8):4727–4729 (1991).

*Primary Examiner*—L. Kiliman
*Attorney, Agent, or Firm*—Peter J. Dehlinger; Judy M. Mohr

[57] ABSTRACT

A magnetic thin-film media with high coercivity and low noise characteristics is disclosed. The medium has a gradient-composition thin-film magnetic layer in which a lowermost stratum is composed of a first alloy, preferably, having relatively low noise and low magnetic remanence characteristics, and an uppermost stratum composed of a second alloy having relatively high noise and high magnetic remanence characteristics. The medium is characterized by a coercivity which is substantially greater, and a media noise which is substantially less than that of a similar medium whose magnetic thin-film layer is composed of either the first or second alloy alone. Also disclosed is a method of producing such a medium.

5 Claims, 5 Drawing Sheets

THIN-FILM MEDIUM WITH COMPOSITIONAL GRADIENT

FIELD OF THE INVENTION

The present invention relates to a thin-film magnetic disc having a magnetic thin-film layer gradient of a plurality of alloys through the layer thickness.

REFERENCES

Futamoto, M., et al., IEEE Transactions on Magnetics, 27 (6): 5280 (1991).

Miller, M. S., et al., J. Applied Phys, 69 (8): 4715 (1991). Ranjan, R., et al., J. Applied Phys, 69 (8): 4727 (1991).

Sanders, I., et al., IEEE Transactions on Magnetics, 25 (5): 3869 (1989).

Shiroishi, Y., et al., IEEE Transactions on Magnetics, 24 (6): 2730 (1988).

White, R. (ed.), Introduction to Magnetic Recording, IEEE Press, New York. (1985).

Yogi, T., et al., IEEE Transactions on Magnetics, 26 (5): 2271 (1990).

Yogi, T., et al., J. Applied. Phys, 69 (8): 4749 (1991)

BACKGROUND OF THE INVENTION

Thin-film hard disc magnetic media are widely used for on-line data storage in computers. In recent years, considerable effort has been spent in achieving higher recording density. Among the most important factors in this recording density are the following parameters.

(1) Magnetic remanence is a measure of the signal amplitude which can be read from an isolated pulse stored in the medium—the greater the remanence, or moment, the greater the signal amplitude which can be detected in a reading operation.

(2) Coercivity is defined as the magnetic field required to reduce the remanence magnetic flux to 0, i.e., the field required to erase a stored bit of information. Higher coercivity in a medium allows adjacent recorded bits to be placed more closely together without mutual cancellation. Thus, higher coercivity is associated with higher information storage density.

(3) Signal/noise ratio (SNR) is defined as the ratio of the power of a given signal to the noise power in a given bandwidth, and provides a measure of signal amplitude relative to noise level. The higher the S/N ratio, the greater the bit density which can be read with a given degree of reliability.

(4) Overwrite is defined as the effectiveness in erasing a signal read at one frequency with a higher frequency signal. Overwrite provides a measure of the residual signal which remains after overwrite by a new signal.

(5) Flying height is the distance at which a read/write head floats above the spinning disc. Less overlaps of voltage signals in adjacent magnetic domains in the disc occurs as the read/write head is moved closer to the disc surface, allowing recording density to be increased. The flying height is limited principally by surface irregularities in the disc. For a thin-film medium formed on a standard aluminum substrate, the minimum flying height is about 6 micro-inches. Flying heights as low as 1–2 micro-inches can be achieved in a thin-film medium formed on more perfect-surface substrate, such as a glass substrate.

(6) Magnetic hysteresis loop squareness is the ratio of coercivity to saturation field. As the saturation field becomes smaller and approaches the coercivity, it takes less field strength to switch or "write to" the medium.

(7) Bit shift or peak shift is a term that refers to the broadening between voltage peaks, as well as the reduction in peak amplitude, that occurs in the read voltage waveform. It is generally desired to achieve low bit shifting inasmuch as bit shifting limits the resolution at which adjacent peaks can be read, and thus places an upper limit on recording density.

(8) Bit density is the density in the medium at which bits are recorded. A bit is identified as a flux transition in the medium, and bit density is measured as the number of flux transitions per unit length. Typically, the higher the bit density, the lower the signal-to-noise ratio.

(9) Pulse width is a parameter that is generally inversely related to the coercivity. The higher the coercivity, the narrower a bit needs to be sensed.

(10) Signal amplitude, or peak-to-peak amplitude of a single pulse is a function of recording frequency. The recording density of the medium is related to the drop in the signal amplitude at increasing recording frequency.

(11) Signal resolution is the ratio of high-frequency track average amplitude divided by the low-frequency track amplitude. The recording frequency at which 70% resolution is achieved represents one measure of information storage density on a disc.

SUMMARY OF THE INVENTION

In one aspect, the invention includes a magnetic thin-film medium having (a) a disc-like substrate, (b) a sputtered underlayer formed on the substrate surface, and (c) a sputtered magnetic thin-film layer having a thickness between about 200–1,000 Å, and an axial composition gradient in which a lowermost stratum of the layer, immediately adjacent the sputtered underlayer, is composed of a first alloy having relatively low noise and low magnetic remanence characteristics, when deposited by sputtering as a single magnetic layer, and an uppermost stratum of the magnetic layer is composed of a second alloy having relatively high noise and magnetic remanence characteristics. The medium is characterized by (i) a coercivity which is substantially greater than that of a similar medium whose magnetic thin-film layer is composed either the first or second alloy alone; and (ii) a media noise level which is substantially less than that of a similar medium whose magnetic thin-film layer is composed of either the first or second alloy alone.

In one embodiment, the sputtered underlayer is a chromium underlayer having a thickness between about 300 and 3,000 Å. The thin-film layer has a thickness between about 400–800 Å. The lower-stratum and upper-stratum alloys include cobalt and one or more of the elements Cr, Nb, Ta, V, W, B, Zr, Si, Hf, P, and the magnetic layer has an increasing amount of Pt and/or Ni on progressing from the lower to the upper stratum.

In another aspect, the invention includes a method of forming a layered magnetic thin-film layer on a disc-like substrate. The method includes moving a disc-like substrate, in an upstream-to-downstream direction, through a first sputtering zone having a chromium containing target, under conditions effective to produce on the substrate, an underlayer having a thickness between about 300 and 3,000 Å. The substrate is then moved through a second sputtering zone having a segmented target providing (i) an upstream target segment composed of a first alloy having relatively low noise and low magnetic remanence characteristics, when deposited by sputtering as a single magnetic layer, and positioned to deposit sputtered material onto the coated substrate, as the substrate moves into and through an upstream region of the sputter deposition zone, and (ii) a downstream target segment composed of a second alloy having relatively high noise and magnetic remanence characteristics, and being positioned to deposit sputtered material onto the coated substrate, as the substrate moves through and out of a downstream region of said sputter deposition zone. A coercivity in the medium is achieved which is substantially greater, and a media noise level which is substantially less, than that of a similar medium whose magnetic thin-film layer is composed either of the first or second alloy alone.

In one embodiment of the method the substrate is carried, for movement through the first and second sputtering zones, on a pallet which supports a plurality of such coated substrates. The upstream target segment is composed of an alloy containing Co and one or more of the elements Cr, Nb, Ta, V, W, B, Zr, Si, Hf, or P, and the downstream target segment is composed of an alloy containing Co, one or more of the elements Cr, Hb, Ta, V, W, B, Zr, Si, Hf, or P, and has a greater amount of Pt and/or Ni than the upstreat target segment. T These and other objects and features of the present invention will become more fully apparent when the following detailed description of the invention is read in conjunction with the accompanying drawings.

DETAILED DESCRIPTION OF THE INVENTION

I. Thin-Film Medium

Figure 1:
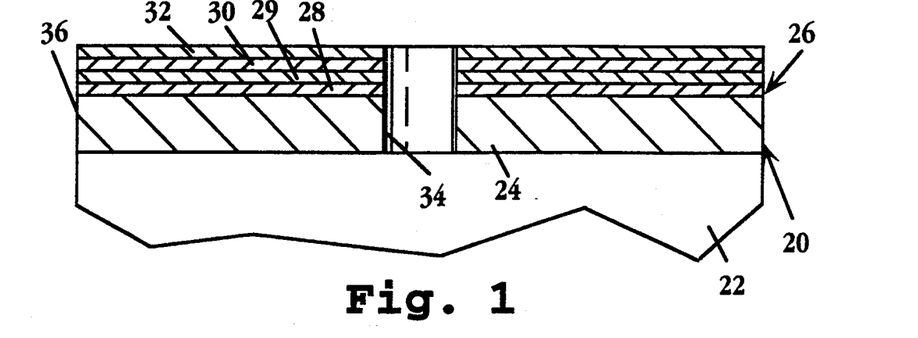
FIG. 1 is a cross-sectional view of a thin-film magnetic disc formed in accordance with the present invention.

FIG. 1 shows in cross sectional view, a fragmentary portion of a thin-film medium or disc 20 formed in accordance with one embodiment of the present invention. The disc generally includes a rigid substrate 22, and forming successive thin-film layers over the substrate, a sputtered layer, such as a crystalline underlayer 24 or a nickel-containing alloy, which is sputtered directly onto the substrate, a magnetic thin-film layer 26 composed of lower, intermediate and upper strata 28, 29 and 30, respectively, and a protective carbon overcoat 32.

Finally, a lubricant layer (not shown) of perfluoropolymer is formed on the protection layer which may be composed of Am2001 manufactured by Montedison Company. The lubricant layer preferably has a thickness of between 10 and 40 Å. It is understood that three strata are typically in the form of a continuous gradient in which the lower sublayer of the gradient is formed predominantly of one alloy $M_1$, the upper sublayer is formed predominantly of another alloy $M_2$ and the intermediate sublayer is formed of increasing amounts of alloy $M_2$ on progressing toward the upper sublayer.

The substrate may be a textured substrate, such as a conventional surface-coated, textured aluminum substrate of the type used commonly for digital recording medium. Typically, the substrate is first plated with a selected alloy plating, such as a nickel/phosphorus plating, to achieve a requisite surface hardness, with the thickness of the plating being about 300–700 microinches. Alternatively, the substrate may be a textured or non-textured glass, ceramic or carbon substrate, such as described in co-owned patent application for "Glass Substrate with Controlled Low-Friction Surface," Ser. No. 475,715, filed Feb. 20, 1990.

Two conventional size substrates have outer diameters of 130 and 95 mm (5.1 and 3.74 inches), with corresponding inner diameters of 40 and 25 mm (1.57 and 0.98 inches), respectively. The discs used for the preferred embodiment of the present invention the comparative embodiments have inner diameters of 0.98 inches and outer diameters of 3.74 inches. The inner and outer edges of the disc which define these diameters are indicated at 34, 36, respectively, in FIG. 1.

The crystalline underlayer is preferably a sputtered chromium underlayer having a thickness between about 300–3,000 Å. High coercivity, remanence and loop squareness values are achieved particularly at an underlayer thickness of between about 1,000–3,000 Å. Chromium-containing alloys, such as CrV, CrGd and CrSi, may also be suitable, as may a tungsten underlayer.

The sputtered magnetic thin-film layer 26 has an axial composition gradient in which lowermost stratum 28, immediately adjacent the sputtered underlayer, is composed of a first alloy, identified generally as M1, having relatively low noise and low magnetic remanence characteristics, when deposited by sputtering as a single magnetic layer. Uppermost stratum 30 is composed of a second alloy having relatively high noise and magnetic remanence characteristics. Intermediate layer 29 is a transitional gradient from alloy M1 to alloy M2. The medium is characterized by (i) a coercivity which is substantially greater than that of a similar medium whose magnetic thin-film layer is composed of either the first or second alloy alone; and (ii) a media noise level which is substantially less than that of a similar medium whose magnetic thin-film layer is composed of either the first or second alloy alone.

The magnetic layer in the FIG. 1 embodiment has a preferred magnetic-film thickness between about 200 to to 400 Å. In the embodiment shown, the two sublayers are composed of different magnetic alloys, preferably Co-based magnetic alloys. Typically, the alloys' will contain Co and one or more of the elements Nb, Cr, Ta, V, W, B, Zr, Si, Hf, or P. In one embodiment, the lower alloy is composed of 70–90 atom percent cobalt, 5–20 atom percent chromium, and 2–10 atom percent tantalum. A specific example is an alloy containing Co/Cr/Ta at an atom ratio of 84.5:12.5:3, as is shown in Table 1. The upper alloy is composed of 55–70 atom percent cobalt, 5–40 atom percent nickel, and 3–20 atom percent chrome. One specific example contains 62.5 atom percent cobalt, 30 atom percent nickel, and 7.5 atom percent chrome, as is also shown in Table 1.

TABLE 1

| Magnetic Alloy Compositions | Atomic Weight % in | |
| --- | --- | --- |
| | M1 | M2 |
| Cobalt | 84.5 | 62.5 |
| Chrome | 12.5 | 7.5 |
| Tantalum | 3 | — |
| Nickel | — | 30 |

II. Method of Producing the Medium

Conventional sputtering apparatuses (not shown) may be used in the method of the invention for producing the thin-film medium described in Section I. The apparatus includes a vacuum chamber having at least four stations at which sputtering or heating operations occur. A heating station at the upstream end of the chamber has a plurality of infrared lights or resistive heaters which are arrayed for heating both sides of a substrate carried through the station in the chamber on a disc holder or pallet.

Downstream of the heating station are three sputtering stations at which are sputtered (1) the chromium underlayer, (2) the three strata forming the magnetic thin film, and (3) the carbon overlayer. The basic sputtering apparatus is preferably a commercial system, such as is available from Varian/Intevac (Santa Clara, Calif.), Circuits Processing Apparatus (Fremont, Calif.), ULVAC (Japan), Leybald Heraeus (Germany), VACTEC (Boulder, Colo.), ANELVA (Japan), or Materials Research Corporation (Albany, N.Y.). These systems are double-sided, in-line, high-throughput machines having two interlocking systems, for loading and unloading.

Figure 5:
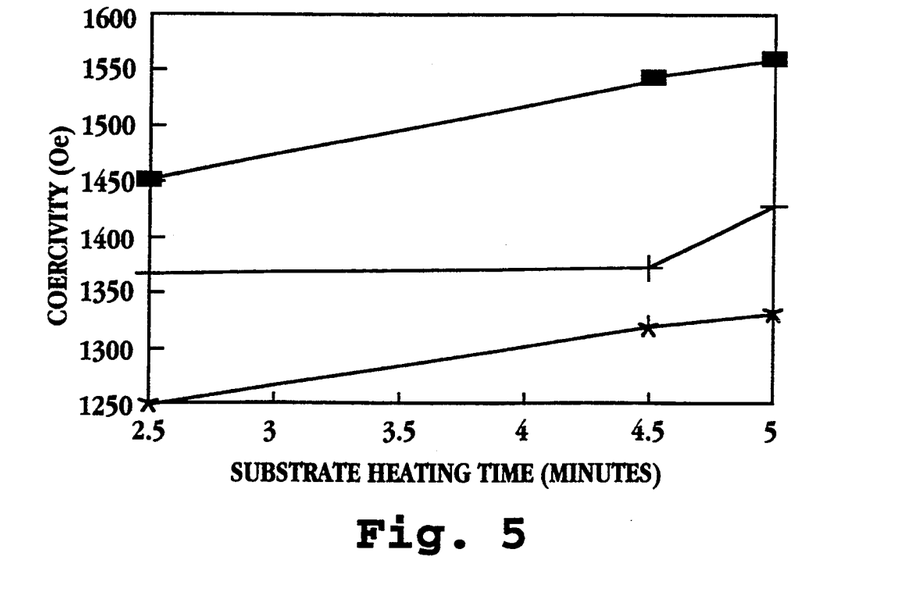
FIG. 5 is a plot of coercivity in a disk with a sputtered magnetic thin film composed of CoCrTa (crosses), of CoNiCr (stars), and of a compositional gradient of these two alloys (boxes), as a function of substrate heating time.

In operation, the sputtering chamber is evacuated to pressure of about $10^{-7}$ Torr, and argon gas is introduced into the chamber to a final sputtering pressure of 5–20 mTorr. The substrate is heated in the heating station to a selected temperature before advancing into the three sputtering chambers. The heating conditions in the apparatus are preferably adjusted to achieve a substrate temperature of between about 200° C., and preferably about 270° C. The substrate temperature can go up to about 400° C. for non-metallic substrates. FIG. 5 shows the resultant coercivity of discs having magnetic layers made of media M1 (crosses) or M2 (stars), or a media formed as a composition gradient M2/M1 (boxes). For the heating times of 2.5, 4.5 and 5 minutes, in all cases, the higher coercivity results from longer heating times. Further, the coercivity of the disc with the gradient media is higher than for discs with magnetic layers formed of either M1 or M2 media.

The heated substrate is moved into the first sputtering chamber, and the chromium underlayer is sputtered onto the textured disc surface under which in the deposition layer (110) crystal plane is predominantly the plane of the substrate. That is, the chromium layer has a high anisotropic parallel/perpendicular crystal orientation ratio. This anisotropy is important in establishing desired magnetic-layer crystal orientation during formation of the magnetic layer in the parallel c-axis direction, which in turn is requisite for achieving high coercivity in longitudinal recording. Sputtering voltage and deposition rates which favor (110) crystal plane formation are known to those skilled in the art.

Figure 6:
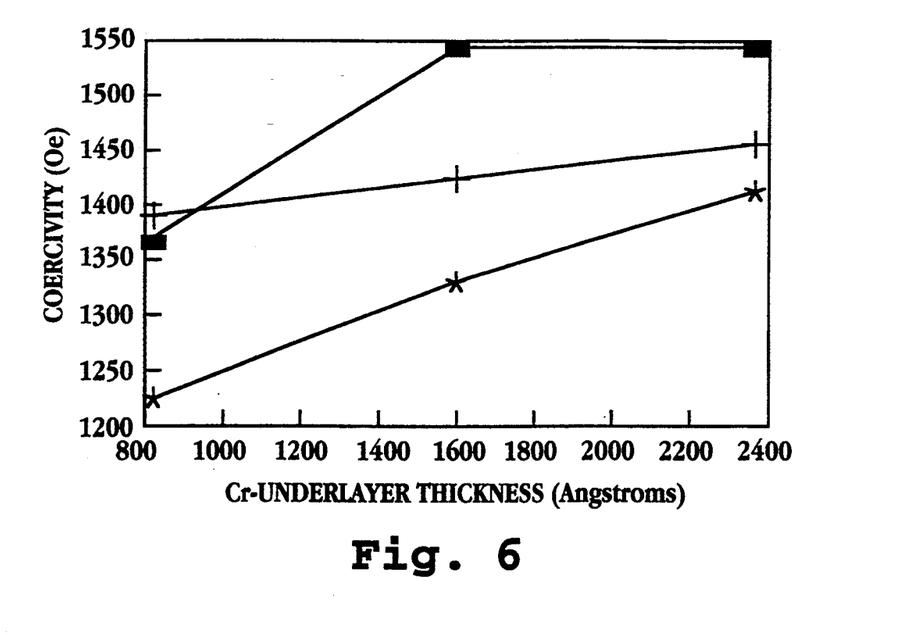
FIG. 6 is a plot of coercivity in a disk with the same thin films of FIG. 5, as a function of Cr underlayer thickness.

The underlayer thickness may be selected, in the present invention, to achieve desired magnetic properties in the thin-film medium of the invention. Studies carried out with Co/Cr/Ta/Pt magnetic thin film media, and reported in co-owned U.S. Pat. No. 5,049,451, indicate that highest coercivity and resolution will be achieved at underlayer thicknesses between about 1,000 to 3,000 Å. The underlayer thickness is controlled by conventional sputter deposition parameters, such as sputter pressure, target power, voltage, deposition time, etc. These parameters are adjusted, conventionally, to achieve the desired underlayer thickness. FIG. 6 shows the resultant coercivity of discs made with media M1, M2 and M2/M1 as a function of the chrome-underlayer thickness. The discs having greater underlayer thickness generally have higher coercivity. The coercivity of the compositional gradient media is greater than that of either of the two non-gradient media.

Figure 2:
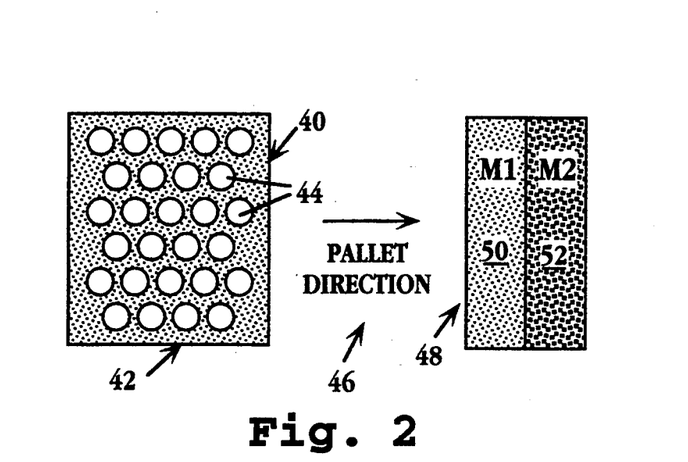
FIG. 2 is a simplified plan view showing a pallet of discs prior to passage through a sputtering station in a sputtering apparatus used in producing the thin-film medium of the invention.

FIG. 2 shows a pallet 40 containing an array 42 of individual in-process discs 44 consisting of the substrate and the underlayer, prior to entry into a second sputtering station, shown generally at 46. Sputtering station 46 includes a target 48 formed of an upstream portion 50 made of alloy M1 and an abutting downstream portion 52 made of alloy M2. The target has a length corresponding to the length of the pallet so that all discs are consistently sputtered with the target alloys as the pallet passes through the sputtering station.

Figure 3:
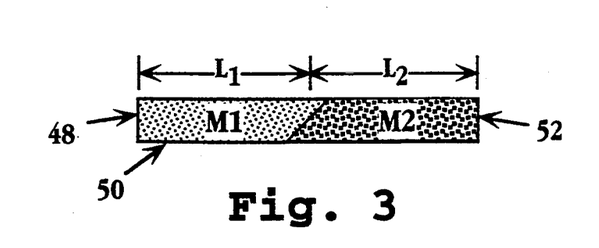
FIG. 3 is an end view of the sputtering target of FIG. 2.

As shown in FIG. 3, the target portions form a unitary single target. The two portions are joined along an angled face 54 in order to facilitate adhesion during manufacture. Other forms of targets are also within the contemplation of the invention. For example, the two portions could be slightly spaced apart if a reduced intermediate stratum 29 is desired relative to lower and upper stratums 28 and 30. Also, the average length, L, of the portions are approximately equal, as shown in FIG. 3. This dimension can be changed in one or both of the portions to vary the amount of deposition of the respective media on the discs.

Figure 4A:
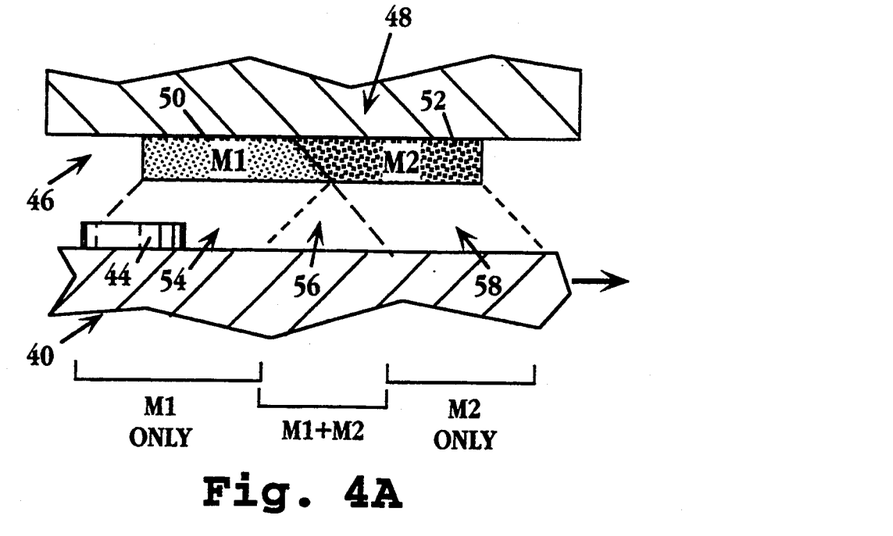
FIGS. 4A–4C are simplified end views of the sputtering station of FIG. 2 illustrating deposition of the thin-film medium of the invention.
Figure 4B:
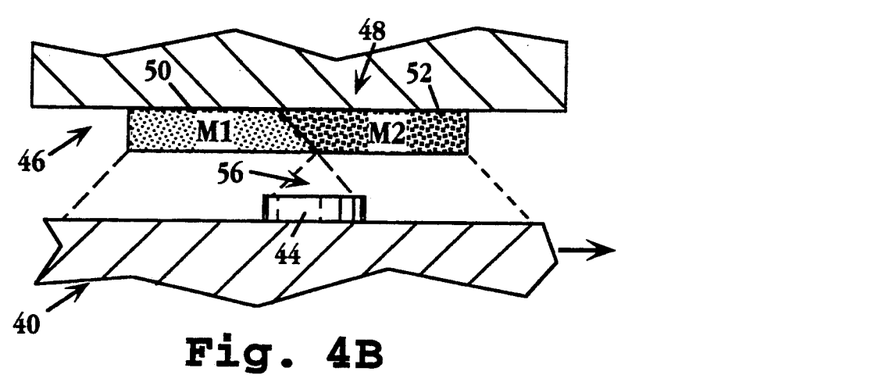
Figure 4C:
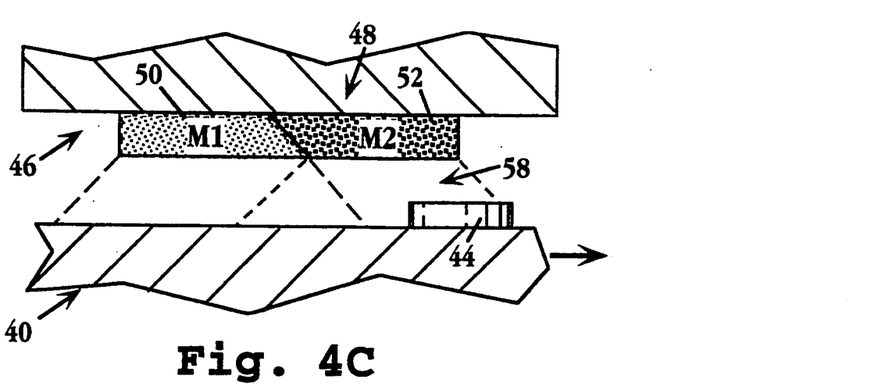

FIGS. 4A–4C illustrate simplistically the process of sputtering a disc 44 with magnetic media during manufacture of a disc 20 shown in FIG. 1. FIG. 4A illustrates a disc 44 on a pallet 40 after it has just entered an initial sputtering zone 54 in which only medium M1 from target portion 50 is deposited. FIG. 4B shows the disc as it travels through an intermediate sputtering zone 56 in which it is sputtered from both target portions. As it travels through this zone, it receives increasing amounts of medium M2 from target portion 52, and decreasing amounts of medium M1. As shown in FIG. 4C, the disc completes travel through sputtering station 46 by passing through a final sputtering zone 58 during which the disc is only sputtered with medium M2.

This process then results in a magnetic thin film layer 26 formed with an axial composition gradient having lower, intermediate and upper stratum of magnetic media, as is described above with reference to FIG. 1. The lowermost stratum of the layer, immediately adjacent the sputtered underlayer, preferably is composed of a first alloy having relatively low noise and low magnetic remanence characteristics, when deposited by sputtering as a single magnetic layer. The uppermost stratum of the underlayer is composed of a second alloy having relatively high noise and magnetic remanence characteristics. This results in a composite magnetic film having (i) a coercivity which is substantially greater than that of a similar medium whose magnetic thin-film layer is composed either the first or second alloy alone, and (ii) a media noise level which is substantially less than that of a similar medium whose magnetic thin-film layer is composed either the first or second alloy alone.

The carbon overcoat in the thin-film medium is preferably a carbon layer formed by sputtering carbon onto the magnetic layer, under conditions in which the carbon is in a predominantly $sp_2$, diamond-like structure. The overcoat thickness is preferably between 200 and 500 Å.

To assess the performance characteristics of magnetic media constructed in accordance with the invention, four thin-film media were prepared. Two of the media had single alloy magnetic layers formed either as a single layer of CoCrTa (M1) or as a single layer of CoNiCr (M2), as described in Table 1. As will be seen with reference to FIGS. 5-9 discussed below, the CoCrTa medium has relatively low noise and low magnetic remanence characteristics, when deposited by sputtering as a single magnetic layer. The CoNiTa medium has relatively high noise and magnetic remanence characteristics.

The other two discs were formed as a compositional gradient layer with M1 as the lower stratum and M2 as the upper stratum (M2/M1), or with M2 as the lower stratum and M1 the upper stratum (M1/M2). Although both of these gradient media exhibit increased coercivity relative to the individual media, the M1/M2 gradient medium has substantially higher noise characteristics than the M2/M1 gradient medium, and is therefore less desirable.

The recording properties of the media discussed below were measured with a Guzik Model 501 read/write analyzer, using a thin-film inductive reading and recording head with a gap length of 0.36 microns, a gap width of 11 microns, a pole width of 12-15 microns, and a coil with 30 turns. The flying height at a linear velocity varied between 7.7 (ID) and 17 (OD) meters/second was in the range of 100 to 150 nm. The head inductance was 1.1 $\mu$Henry and resistance, 30 ohms. The flying height was 114 nm. Recording current was 30 mAmps for saturation. Recording frequency was at 7.17 MHz at the disc's inner diameter and 14.64 MHz at the disc's outer diameter, these frequencies corresponding to the normal operating head read-write frequencies of a disc having inner and outer diameters of 25 mm and 95 mm, respectively.

The transition noise was measured by using the read/write analyzer and a Hewlett-Packard model HP-5385A spectrum analyzer. The noise power spectral density of the read back signal was measured and the noise power spectral density of the channel subtracted. The result was integrated over 0-20 MHz to include all medium noise power. The total media noise, Nm, was obtained from repeated measurements at different linear densities. Nm is a measure of the variation in transition location. Noise and signal amplitude are referenced to the output of the recording head. The total medium noise voltage, Nm was normalized by dividing by $(Mrt)^2$, a remanence thickness product according to R. A. Baugh et al., IEEE Transactions on Magnetics, MAG-19, 1722 (1983).

Table 2 shows the coercivity, squareness ratio, magnetic remanence ($4\pi Mr$), and magnetic film thickness of the two magnetic alloys M1 and M2 identified in Table 1 and two compositional gradient media M2/M1 and M1/M2 made using the two alloys.

TABLE 2

|  | Compositional Gradient Media | | | |
| --- | --- | --- | --- | --- |
|  | CoNiCr/ CoCrTa (M2/M1) | CoCrTa/ CoNiCr (M1/M2) | CoCrTa M1 | CoNiCr M2 |
| Coercivity (Oe) | 1937 | 1793 | 1589 | 1578 |
| Squareness Ratio | 0.8 | 0.79 | 0.78 | 0.82 |
| 4 $\pi$ Mr (Guass) | 7633 | 8346 | 6493 | 11,435 |
| Magnetic Film Thickness (Å) | 274 | 256 | 330 | 204 |

The coercivity of the compositional gradient is about 20% higher than the CoCrTa and CoNiCr media. The magnetic moment of the gradient media is about 15-30% higher than the CoCrTa media but about 25-35% lower than the CoNiCr media.

Table 3 lists various parameters for discs having magnetic thin-film layers formed from media M1, M2 and M2/M1, measured at the inner diameter at a frequency of 7.17 MHz. For each type of thin-film media, the parameters are coercivity (BH HC), measured in Oe, the high frequency signal amplitude (HF), measured in $\mu$V, percent resolution, overwrite (OW), measured in $-$dB, the pulse width (PW 50), measured in ns, and the bit shift (BS), measured in ns. The linear recording density is 1782 flux changes/mm for all the three medias.

TABLE 3

| Type of Thin Film Media | BH HC (Oe) | HF (uV) | Res. | OW (−dB) | PW 50 (ns) | BS (ns) |
| --- | --- | --- | --- | --- | --- | --- |
| M1 | 1676 | 316 | 87.3 | 35.8 | 61.4 | 13.9 |
| M2 | 1625 | 339 | 86.1 | 34.7 | 61.4 | 16 |
| M2/M1 | 1722 | 318 | 87.4 | 34.5 | 61.8 | 11.1 |

It is seen that these parameters are generally comparable, with significantly lower bit shift for the gradient media compared to the base medium M1 (CoCrTa).

Table 4 shows the same parameters for the same discs as Table 3, but at the outer diameter at a frequency of 14.64 MHz.

TABLE 4

| Type of Thin Film Media | BH HC (Oe) | HF (uV) | Res. | OW (−dB) | PW 50 (ns) | BS (ns) |
| --- | --- | --- | --- | --- | --- | --- |
| M1 | 1676 | 416 | 70.1 | 26.8 | 37.8 | — |
| M2 | 1625 | 450 | 71.6 | 27.2 | 37.6 | — |
| M2/M1 | 1722 | 442 | 73.9 | 25.5 | 38 | — |

Figure 7:
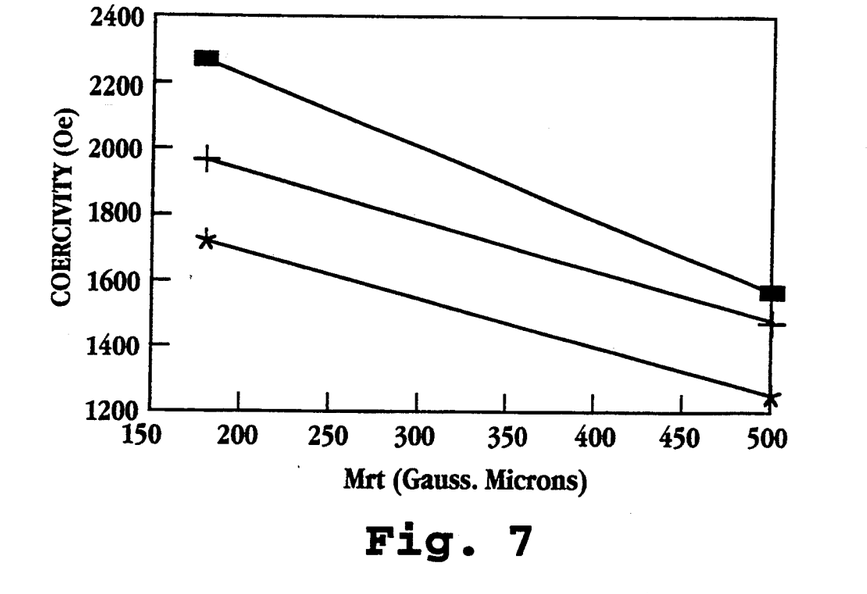
FIG. 7 is a plot of coercivity as a function of magnetic remanence for the thin films of FIG. 5.
Figure 8:
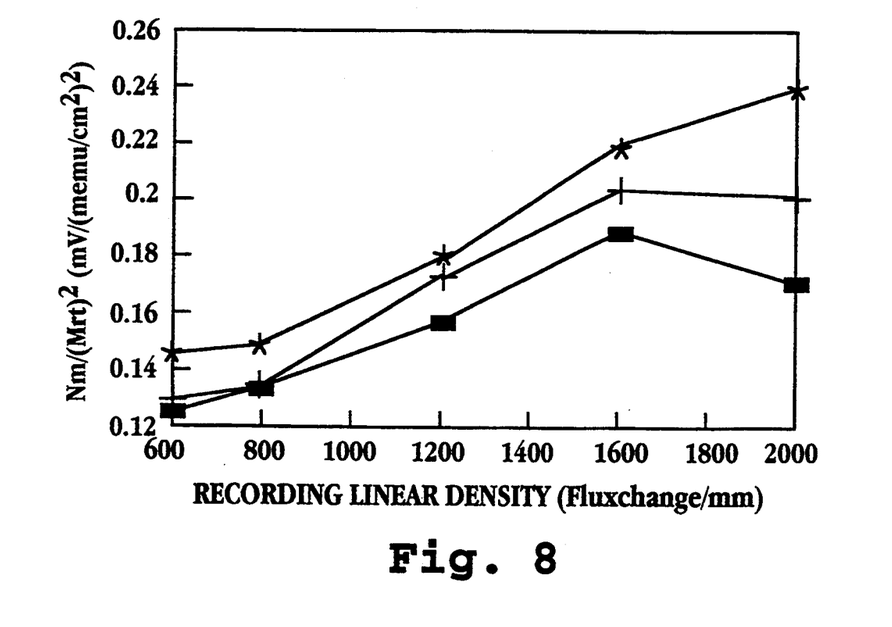
FIG. 8 is a plot of normalized noise as a function of recording linear density for the thin films of FIG. 5.
Figure 9:
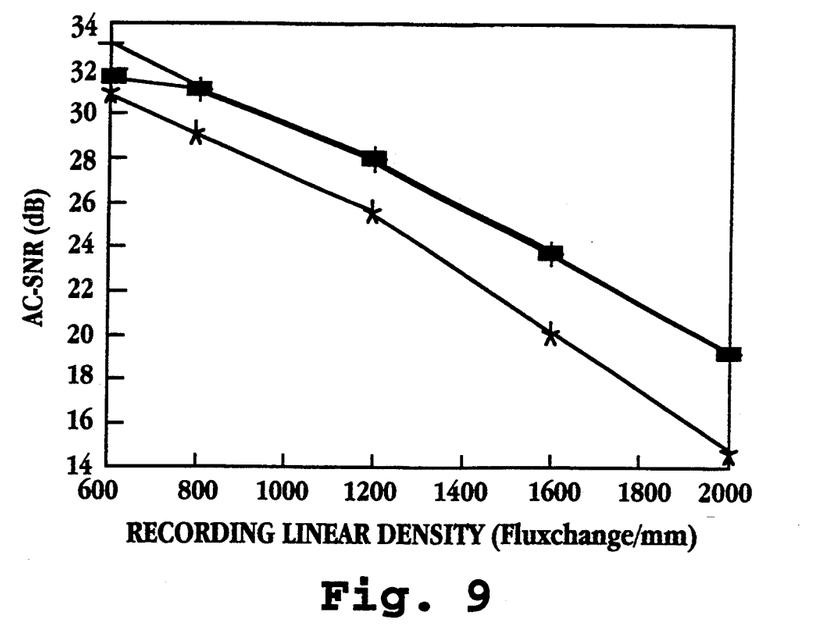
FIG. 9 is a plot of signal-to-noise ratio (SNR) as a function of recording linear density.

In the outer diameter zone, the resolution is improved and the overwrite is reduced for the gradient media. FIGS. 7-9 show other comparisons over a range of values.

FIG. 7, a plot of coercivity of the three discs of M1, M2 and M2/M1 magnetic remanence-thickness product, shows that there is a tradeoff between the remanence and coercivity. As the remanence-thickness product increases there is a corresponding decrease in coercivity. However, for both remanence-thickness product values measured, the coercivity of the disc having the composition gradient thin-film media is greater than the discs made with the two single types of magnetic thin-film layers.

The normalized noise of the discs as a function of recording linear density is shown in FIG. 8. As expected, as the recording density increases, the noise increases. Again, the disc having the composition gradient magnetic media exhibits a lower noise level than the discs having magnetic layers formed of only the M1 or M2 medium.

The plot of alternating current signal-to-noise ratio of the composition gradient medium is seen to be comparable to the CoCrTa medium and generally greater than that of the CoNiCr medium. The SNR varies generally inversely with the recording linear density, which is consistent with the change in the normalized noise shown in FIG. 8. As the noise level increases, the signal-to-noise ratio decreases.

From the foregoing, it can be appreciated how various objects and features of the invention are met. A two-magnetic-alloy composite target is used in an in-line pass-by sputtering system to produce a compositional gradient thin-film media. As a result, the remanence magnetization of the compositional gradient media is higher than the single-alloy media, at least with respect to the CoCrTa medium. The coercivity is higher and the coercivity increases more for an increase in Cr-underlayer thickness and substrate heating. The bit shift and media noise are reduced. The SNR is better than the high-noise single medium and equivalent to the low-noise single medium. It will thus be appreciated that a magnetic thin-film medium having the axial compositional gradient medium provides an improvement over the non-gradient media formed from either one of the constituent alloys.

Although the invention has been described with respect to particular embodiments, it will be apparent to those skilled in the art that various changes and modifications can be made without departing from the invention.

It is claimed:

1. A magnetic thin-film medium comprising
a substrate,
a sputtered underlayer formed on the substrate surface, and
a sputtered magnetic thin-film layer having a thickness between about 200–1,000 Å, and an axial composition gradient in which a lowermost stratum of the layer, immediately adjacent the sputtered underlayer is composed of a first cobalt-containing alloy and an uppermost stratum of the magnetic layer is composed of a second cobalt-containing alloy, where said second alloy contains a higher percentage of platinum or nickel than said first alloy, and said second alloy has higher noise and magnetic remanence characteristics than said first alloy when said alloys are deposited as single magnetic layers,
wherein the medium is characterized by:
(i) a coercivity which is substantially greater than a coercivity of a medium having an underlayer and a single magnetic thin-film layer composed of either the first or second alloy alone; and
(ii) a media noise level which is substantially less than the noise level of a medium having an underlayer and a single magnetic thin-film layer composed of either the first or second alloy alone.

2. The medium of claim 1, wherein the sputtered underlayer is a chromium underlayer having a thickness between about 300 and 3,000 Å.

3. The medium of claim 1, wherein the sputtered magnetic thin-film layer has a thickness between about 200–800 Å.

4. The medium of claim 1, wherein the lower-stratum alloy is a Co/Cr/Ta alloy, and the upper-stratum alloy is a Co/Ni/Cr alloy.

5. The medium of claim 4, wherein the Co/Cr/Ta alloy contains between 70–90 atom percent cobalt, 7–20 atom percent chromium, and 2–10 atom percent tantalum, and the Co/Ni/Cr alloy contains between about 55–70 atom percent cobalt, 5–40 atom percent nickel, and 3–20 atom percent chromium.

* * * * *